US012722085B2

(12) United States Patent
Zhang

(10) Patent No.: US 12,722,085 B2
(45) Date of Patent: Sep. 1, 2026

(54) METHOD FOR PICKING UP ITEM IN GAME, AND NON-TRANSITORY STORAGE MEDIUM AND ELECTRONIC DEVICE THEREOF

(71) Applicant: NETEASE (HANGZHOU) NETWORK CO., LTD., Hangzhou (CN)

(72) Inventor: Jianmin Zhang, Hangzhou (CN)

(73) Assignee: NETEASE (HANGZHOU) NETWORK CO., LTD., Hangzhou City (CN)

( * ) Notice: Subject to any disclaimer, the term of this patent is extended or adjusted under 35 U.S.C. 154(b) by 203 days.

(21) Appl. No.: 18/574,800

(22) PCT Filed: Mar. 16, 2022

(86) PCT No.: PCT/CN2022/081088
§ 371 (c)(1),
(2) Date: Dec. 28, 2023

(87) PCT Pub. No.: WO2023/019932
PCT Pub. Date: Feb. 23, 2023

(65) Prior Publication Data
US 2025/0018296 A1 Jan. 16, 2025

(30) Foreign Application Priority Data
Aug. 16, 2021 (CN) ........................ 202110938415.3

(51) Int. Cl.
*A63F 13/00* (2014.01)
*A63F 13/2145* (2014.01)
(Continued)

(52) U.S. Cl.
CPC .......... *A63F 13/63* (2014.09); *A63F 13/2145* (2014.09); *A63F 13/533* (2014.09);
(Continued)

(58) Field of Classification Search
None
See application file for complete search history.

(56) References Cited

U.S. PATENT DOCUMENTS 9,795,885 B1 * 10/2017 Kim ...................... A63F 13/792
2008/0070686 A1 * 3/2008 Satsukawa .......... A63F 13/5255 463/37

(Continued)

FOREIGN PATENT DOCUMENTS

CN 108579088 A 9/2018
CN 108888956 A 11/2018

(Continued)

OTHER PUBLICATIONS

English Translation of CN 112023392 (Year: 2020).*

(Continued)

*Primary Examiner* — Paul A D'Agostino
(74) *Attorney, Agent, or Firm* — Qinghong Xu

(57) ABSTRACT

A method for picking up an item in a game, includes: providing an item pick-up list in a graphical user interface in response to an item pick-up trigger event in a game scene; determining a first target item, in response to a first touch operation acting on the item pick-up list, according to the first touch operation, and displaying an item assembly pop-up window in the graphical user interface, an item assembly interface being displayed in the item assembly pop-up window, the item assembly interface including an assembly position for assembling a virtual item in the item assembly area; controlling, in response to an assembly instruction for the first target item, to assemble the first target item to an assembly position corresponding to the first target item in the item assembly interface when the first target item is a virtual item capable of being assembled in the item assembly area.

20 Claims, 11 Drawing Sheets

(51) Int. Cl.

| | |
|---|---|
| ***A63F 13/533*** | (2014.01) |
| ***A63F 13/63*** | (2014.01) |
| ***A63F 13/837*** | (2014.01) |
| ***G06F 3/04845*** | (2022.01) |
| ***G06F 3/0488*** | (2022.01) |

(52) U.S. Cl.

CPC ........ *A63F 13/837* (2014.09); *G06F 3/04845* (2013.01); *G06F 3/0488* (2013.01); *A63F 2300/308* (2013.01)

(56) References Cited

U.S. PATENT DOCUMENTS

| | | | | |
|---|---|---|---|---|
| 2016/0171827 | A1* | 6/2016 | Washington | G07F 17/3227 463/16 |
| 2016/0171835 | A1* | 6/2016 | Washington | G07F 17/3223 463/25 |
| 2018/0190087 | A1* | 7/2018 | Maalouf | G06F 1/163 |
| 2019/0091574 | A1* | 3/2019 | Wei | A63F 13/5378 |
| 2019/0130701 | A1* | 5/2019 | Simons | H04L 9/3226 |
| 2019/0272707 | A1* | 9/2019 | Washington | A63F 13/837 |
| 2020/0338452 | A1* | 10/2020 | Yang | A63F 13/79 |
| 2020/0346113 | A1* | 11/2020 | Sun | A63F 13/837 |
| 2020/0353355 | A1* | 11/2020 | Wang | G06F 3/0481 |
| 2020/0360806 | A1* | 11/2020 | Sun | A63F 13/52 |
| 2020/0393953 | A1 | 12/2020 | Zhang et al. | |
| 2020/0406142 | A1* | 12/2020 | Qiu | A63F 13/5372 |
| 2021/0001218 | A1 | 1/2021 | Lan | |
| 2022/0161138 | A1* | 5/2022 | Liang | A63F 13/426 |
| 2022/0297003 | A1* | 9/2022 | Gu | A63F 13/837 |
| 2023/0360351 | A1* | 11/2023 | Zeng | A63F 13/837 |
| 2025/0018296 | A1* | 1/2025 | Zhang | G06F 3/0482 |

FOREIGN PATENT DOCUMENTS

| | | | |
|---|---|---|---|
| CN | 109045695 | A | 12/2018 |
| CN | 110270098 | A | 9/2019 |
| CN | 111111174 | A | 5/2020 |
| CN | 111870943 | A | 11/2020 |
| CN | 111888760 | A | 11/2020 |
| CN | 112023392 | A | 12/2020 |
| CN | 112791390 | A | 5/2021 |
| CN | 113694513 | A | 11/2021 |
| JP | 2021514267 | A | 6/2021 |
| JP | 2021520286 | A | 8/2021 |
| JP | 2022517337 | A | 3/2022 |
| JP | 2022535635 | A | 8/2022 |
| WO | 2020250297 | A1 | 12/2020 |

OTHER PUBLICATIONS

Notice of Allowance dated Jul. 30, 2024 of Japanese Application No. 2023-549971.

International Search Report dated Apr. 28, 2022 for PCT Application No. PCT/CN2022/081088.

1st Office Action dated Nov. 28, 2023 for Chinese Application No. 202110938415.3.

The fastest way to loot the backpack in PUBG, the secret of looting 10 times in 1 second is here! https://baijiahao.baidu.com/s?id=1597899974893553418&wfr=spider&for=pc.

* cited by examiner

Firearm/accessory situation 40

Guard situation 41

Auxiliary weapon/missile situation 42

METHOD FOR PICKING UP ITEM IN GAME, AND NON-TRANSITORY STORAGE MEDIUM AND ELECTRONIC DEVICE THEREOF

CROSS REFERENCE TO RELATED APPLICATIONS

The present application is a National Stage Application of International Application No. PCT/CN2022/081088 filed on Mar. 16, 2022 which is based upon and claims priority to Chinese Patent Application No. 202110938415.3 entitled "Method and apparatus for picking up an item in a game, a storage medium, and an electronic device", filed on Aug. 16, 2021, the entire contents of both of which are incorporated herein by reference for all purposes.

TECHNICAL FIELD

The present disclosure relates to the field of game technology, and in particular, to a method and apparatus for picking up an item in a game, a storage medium, and an electronic device.

BACKGROUND

In numerous first-person shooting games FPS, there are mainly two manners of picking up props, "manual pick-up" and "automatic pick-up". The selection right of whether to enable automatic pick-up operation has been opened to players for their own settings in numerous games. When the player selects the manner of "manual pick-up", the prop can be picked up when the game character is close to the prop; a pick-up prop list appears in the interface, and the player can click the prop to pick up the prop into the backpack; if there is need to further assemble or replace the prop picked up, it is needed to open the backpack for operation. When the player selects the manner of "automatic pick-up", the prop can be picked up when the game character is close to the prop; a pick-up prop list appears in the interface; at this time, the system will automatic pick-up the prop into the assembly bar; however, when the assembly bar has been filled with props, and the player wants to pick up a new prop, it is needed to re-open the backpack for manual replacement.

SUMMARY

According to an aspect of the present disclosure, there is provided a method for picking up an item in a game, including: providing a graphical user interface by a terminal device; the graphical user interface displaying a backpack control and a virtual object located in a game scene; the backpack control being configured to display a backpack interface on the graphical user interface in response to a touch operation; the backpack interface including an item storage area and an item assembly area; the item storage area being used for displaying a virtual item picked up but not assembled to the virtual object; the item assembly area being used for displaying a virtual item picked up and assembled to the virtual object; and the method including: providing an item pick-up list in the graphical user interface in response to an item pick-up trigger event in the game scene, where the item pick-up list includes a virtual item that can be picked up by the virtual object; determining a first target item, in response to a first touch operation acting on the item pick-up list, according to the first touch operation, and displaying an item assembly pop-up window in the graphical user interface, where an item assembly interface is displayed in the item assembly pop-up window; and the item assembly interface includes an assembly position for assembling the virtual item in the item assembly area; in response to an assembly instruction for the first target item, controlling to assemble the first target item to an assembly position corresponding to the first target item in the item assembly interface when the first target item is a virtual item that can be assembled in the item assembly area.

According to another aspect of the present disclosure, there is further provided a non-transitory storage medium; the non-transitory storage medium includes a stored program, where when the program is running, the device where the non-transitory storage medium is located is controlled to perform any one of the above methods for picking up an item in a game.

According to another aspect of the present disclosure, there is further provided an electronic device, including a memory and a processor; a computer program is stored in the memory, and the processor is configured to run the computer program to perform any one of the above methods for picking up an item in a game.

BRIEF DESCRIPTION OF THE DRAWINGS

The accompanying drawings described here are used to provide a further understanding of the present disclosure, and constitute a part of the present disclosure. The illustrative embodiments of the present disclosure and the description of them are used to explain the present disclosure, and do not constitute an improper limitation on the present disclosure. In the accompanying drawings.

DETAILED DESCRIPTION

Figure 1:
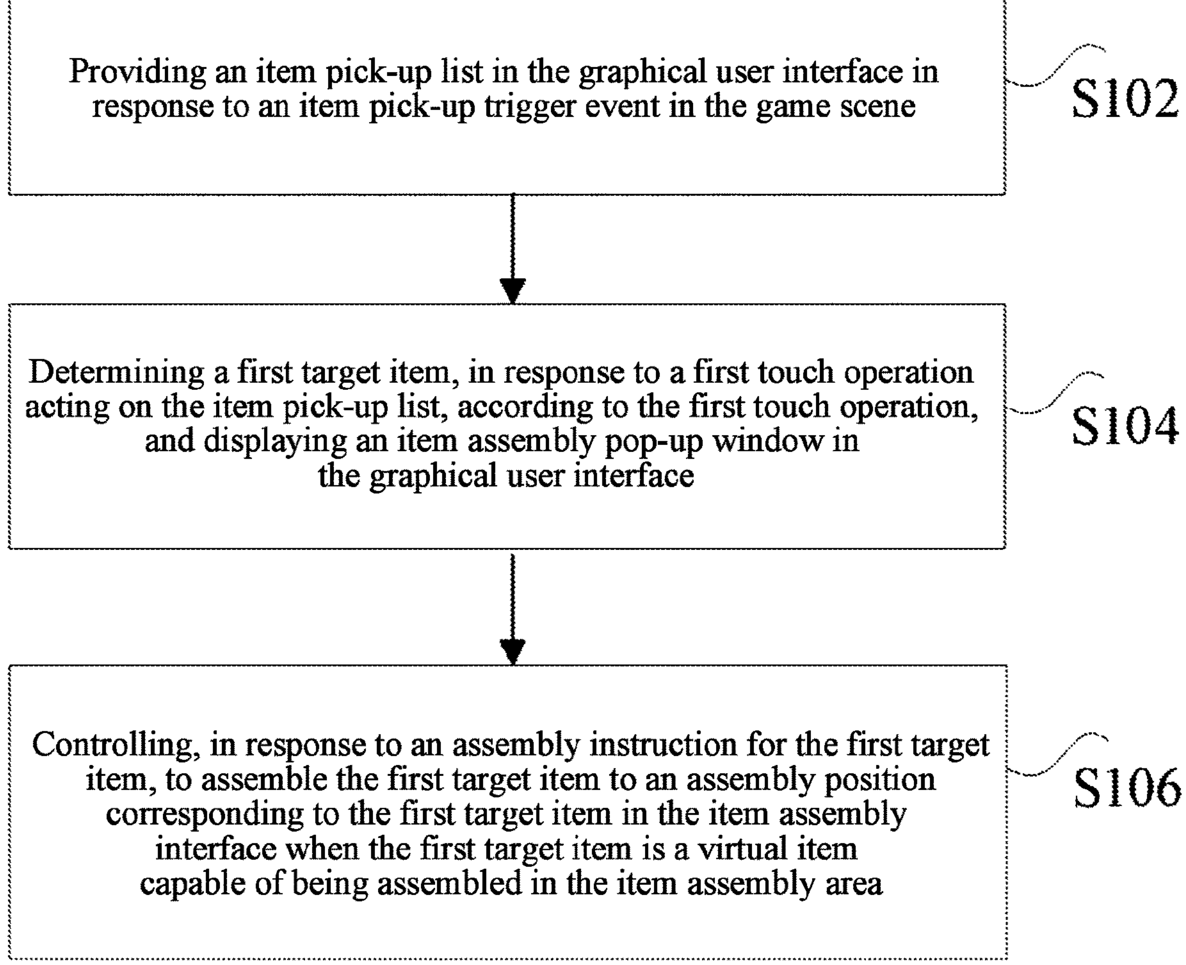
FIG. 1 is a schematic step flowchart of a method for picking up an item in a game according to an embodiment of the present disclosure.

In order to make those skilled in the art better understand the solutions of the present disclosure, the technical solutions in the embodiments of the present disclosure will be clearly and completely described below with reference to the accompanying drawings in the embodiments of the present disclosure. Obviously, embodiments described are only a part of the embodiments of the present disclosure, not all embodiments. All other embodiments obtained by those of ordinary skill in the art based on the embodiments of the present disclosure without creative efforts shall fall within the protection scope of the present disclosure.

It should be noted that the terms "first", "second" and the like in the description and claims of the present disclosure as well as the accompanying drawings are used to distinguish similar objects, and do not need to be used to describe a particular order or sequence. It should be understood that the data used in this way may be interchanged under appropriate circumstances so that the embodiments of the present disclosure described here can be implemented in an order other than those illustrated or described here. Furthermore, the terms "including" and "having" and any variations of them are intended to cover non-exclusive inclusion; for example, processes, methods, systems, products, or devices that include a series of steps or units are not necessarily limited to those steps or units clearly listed, but may include other steps or units not clearly listed or inherent to these processes, methods, products, or devices.

FPS game has a feature of fast pace; for example, when the currently lattice that can be assembled is full, if it is desirable to replace the currently assembled lattice, it is needed to open the backpack for replacement; in this process, the backpack interface is unfolded, thus blocking two-thirds field of view of the current screen; the game character is easily killed by the enemy, and the game interruption feeling is strong. In addition, in order to prevent characters from being killed when assembled and replaced, some players may select to move the game character to a relatively safe place for configuration; therefore, the game prop cannot be picked up or replaced anytime or anywhere, and the game layout strategy lags.

For the above problems, an effective solution has not been proposed currently. In order to solve above problems, the technical solutions used in the embodiments of the present disclosure are as follows.

Firstly, in order to facilitate understanding of the embodiments of the present disclosure, some terms or nouns involved in the present disclosure will be explained below.

An FPS game (First-Person Shooting Game) is a shooting game performed at a player's subjective perspective. The player no longer manipulates the virtual character in the screen like other games to play the game, but experiences the visual impact of the game in immersive.

At present, in numerous first-person shooting games FPS, there are mainly two manners of picking up props, "manual pick-up" and "automatic pick-up". In the embodiments, when a player selects an option of "automatic pick-up", and the virtual game character is close to the item, a pick-up list appears, which is mainly divided into two cases: a player clearly knows the number of each equipment currently owned by the player, so that the player can clearly and quickly position its own operation to autonomously select whether to pick up or replace the game equipment; the player is not sure about or does not know the number of equipment currently owned by the player, some players may pick up the ones into the package firstly as long as they can be picked up, and select the one in higher order to replace the one in low order; some players directly compare the props assembled in their current firearm, and determine whether to replace after weighing and choosing by noting matching degree between the current firearm and the accessory.

According to an embodiment of the present disclosure, there is provided a method embodiment for picking up an item in a game. It should be noted that the steps shown in the flowchart of the accompanying drawings may be executed in a computer system such as a set of computer-executable instructions, and although a logical order is shown in the flowchart, in some cases, the illustrated or described steps may be executed in a different order from that here.

The technical solutions of the method embodiment may be executed in a mobile terminal, a computer terminal, or a similar computing apparatus. By taking that it is run in a mobile terminal as an example, the mobile terminal may be a smart phone (such as an Android mobile phone, an iOS mobile phone, etc.), a tablet computer, a palm computer, and a mobile Internet device (MID), a PAD and other terminal devices. The mobile terminal may include one or more processors (where, the processor may include, but is not limited to, a central processing unit (CPU), a graphics processor unit (GPU), a digital signal processing (DSP) chip, a microcontroller unit (MCU), a field programmable gate array (FPGA), a neural network processing unit (NPU), a tensor processing unit (TPU), an artificial intelligence (AI) type processing unit, and other processing apparatuses) and a memory for storing data. In some embodiments, the mobile terminal may further include a transmission device for a communication function, an input/output device, and a display device. Those of ordinary skill in the art may understand that the above structural description is merely illustrative, and does not limit the structure of the mobile terminal. For example, the mobile terminal may also include more or less components than those described above, or have a different configuration from the structure described above.

The memory may be configured to store a computer program, for example, a software program and a module of an application software, such as a computer program corresponding to the method for picking up an item in a game in an embodiment of the present disclosure. The processor executes various functional applications and data processing by running the computer program stored in the memory, that is, to implement the method for picking up an item in the game. The memory may include a high-speed random access memory, and may further include a non-volatile memory, such as one or more magnetic storage apparatuses, flash memories, or other non-volatile solid-state memories. In some examples, the memory may further include a memory remotely located with respect to the processor, which may be connected to the mobile terminal through a network. Examples of such network include, but are not limited to, the Internet, an enterprise intranet, a local area network, a mobile communication network, and combinations of them.

The transmission device is configured to receive or send data via a network. Specific examples of the above-mentioned network may include a wireless network provided by a communication provider of the mobile terminal. In an example, the transmission device includes a network interface controller (NIC), which may be connected to other network devices through a base station so as to communicate with the Internet. In an example, the transmission device may be a radio frequency (RF) module for communicating with the Internet in a wireless manner. The technical solutions of the method embodiment may be applied to various communication systems, such as a Global System of Mobile Communication (GSM) system, a Code Division Multiple Access (CDMA) system, a Wideband Code Division Multiple Access (WCDMA) system, a General Packet Radio Service (GPRS), a Long Term Evolution (LTE) system, a LTE Frequency Division Duplex (FDD) system, a LTE Time Division Duplex (TDD), a Universal Mobile Telecommunication System (UMTS), a Worldwide Interoperability for Microwave Access (WiMAX) communication system or a 5G system, etc. In some embodiments, a device-to-device (D2D) communication may be performed between more than one mobile terminal. In some embodiments, the 5G system or the 5G network is also referred to as a New radio (NR) system or an NR network.

The display device may be, for example, a touch screen type liquid crystal display (LCD) and a touch display (also referred to as a "touch screen" or "touch display screen"). The liquid crystal display may enable a user to interact with a user interface of the mobile terminal. In some embodiments, the mobile terminal has a graphical user interface (GUI), and the user may perform human-computer interaction with the GUI by touching a finger contact and/or a gesture on the touch-sensitive surface, where the human-computer interaction functions here may In some embodiments include following interactions: creating a webpage, drawing, processing text, making an electronic document, a game, a video conference, instant messaging, receiving and sending an e-mail, a call interface, playing a digital video, playing digital music and/or browsing a network, etc. Executable instructions for performing the above-described human-machine interaction functions are configured or stored in one or more processor-executable computer program products or readable non-volatile storage medium.

FIG. 1 is a schematic step flowchart of a method for picking up an item in a game according to an embodiment of the present disclosure. As shown in FIG. 1, the method includes the following steps.

In step S102, in response to an item pick-up trigger event in a game scene, an item pick-up list is provided in a graphical user interface, where the item pick-up list includes a virtual item capable of being picked up by the virtual object;

In step S104, in response to a first touch operation acting on the item pick-up list, a first target item is determined according to the first touch operation, and an item assembly pop-up window is displayed in the graphical user interface;

In step S106, in response to an assembly instruction for the first target item, when the first target item is a virtual item capable of being assembled in the item assembly area, the first target item is controlled to be assembled to an assembly position corresponding to the first target item in the item assembly interface.

In some embodiments of the present disclosure, the graphical user interface is provided by a terminal device, and the graphical user interface at least displays a backpack control and a virtual object (a virtual game character) located in the game scene; the backpack control is configured to display a backpack interface on the graphical user interface in response to a touch operation, and the backpack interface at least includes an item storage area and an item assembly area; the item storage area is used for displaying a virtual item picked up but not assembled to the virtual object, and the item assembly area is used for displaying a virtual item picked up and assembled to the virtual object.

Figure 2:
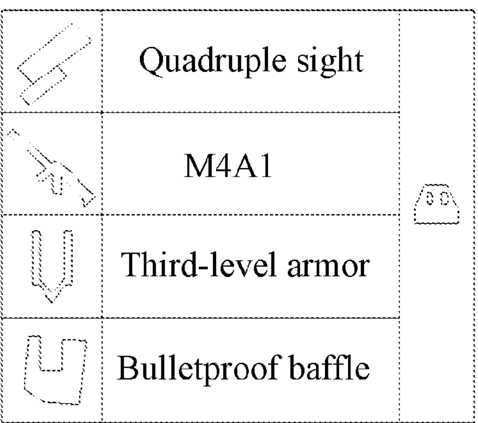
FIG. 2 is a schematic diagram of an item pick-up list according to an embodiment of the present disclosure.

In some embodiments, the player may set the manner of picking up the prop in the game scene as "automatic pick-up"; that is, when it is detected that the distance between the item to be picked up and the virtual object in the virtual game scene is within a preset distance range, in response to an item pick-up trigger event in the game scene, an item pick-up list is provided in the graphical user interface. As shown in FIG. 2, the item pick-up list includes a virtual item that can be picked up by the virtual object, for example, a quadruple sight, a firearm (such as an M4A1 carbine), a third-level armor, a bulletproof baffle, etc.

In the embodiments of the present disclosure, the first touch operation is used for determining a first target item, and displaying an item assembly pop-up window in the graphical user interface; the first target item may be, but is not limited to, a game prop, a game equipment, or the like, met or seen by the virtual game character in the game scene.

In some embodiments, the first touch operation includes a click operation acting on the first target item; for example, a player directly clicks the first target item to trigger a first touch operation acting on the first target item; and/or, the first touch operation includes a drag operation for dragging the first target item out of the item pick-up list; for example, the player drags the first target item out of the item pick-up list to trigger a first touch operation acting on the first target item.

In the embodiments of the present disclosure, an item assembly interface is displayed in the item assembly pop-up window, and the item assembly interface at least partially includes an assembly position for assembling the virtual item in the item assembly area. Among them, it should be noted that after the first target item is determined according to the first touch operation, it may be not considered, but not limit to, whether the first target item is a virtual item that can be an assembled, an item assembly pop-up window is displayed in the graphical user interface; and, the assembly frame displayed in the assembly pop-up window does not need to be an assembly frame corresponding to the first target item.

In some embodiments, when the first touch operation is a drag operation for dragging the first target item out of the item pick-up list, in response to the end of the drag operation, an assembly instruction for the first target item is generated; and in response to the assembly instruction for the first target item, when the first target item is the virtual item that can be assembled in the item assembly area, the first target item is controlled to be assembled to the assembly position corresponding to the first target item in the item assembly interface.

In the embodiment, an item pick-up list is provided in the graphical user interface by responding to an item pick-up trigger event in the game scene, where the item pick-up list includes a virtual item that can be picked up by the virtual object; in response to a first touch operation acting on the item pick-up list, a first target item is determined according to the first touch operation, and an item assembly pop-up window is displayed in the graphical user interface, where an item assembly interface is displayed in the item assembly pop-up window, and the item assembly interface at least partially includes an assembly position for assembling the virtual item in the item assembly area; in response to an assembly instruction for the first target item, when the first target item is a virtual item that can be assembled in the item assembly area, the first target item is controlled to be assembled to an assembly position corresponding to the first target item in the item assembly interface. Through the embodiments of the present disclosure, the purposes of quickly picking up a game equipment and replacing a picked-up game equipment are achieved, thus achieving the technical effects of the interface volume being reduced, the interruption feeling being weak and the strategic deployment response being fast, and further solving the technical problems in the related art that the game character is killed, the game interruption feeling is strong, and the layout strategy lags, due to the fact that the player opens the backpack to pick up or replace the game prop.

In an embodiment, before the step of displaying an item assembly pop-up window in the graphical user interface, the method further includes the following.

In step S202, it is determined whether the first target item is a virtual item that can be assembled in the item assembly area;

In step S204, if yes, the step of displaying the item assembling pop-up window in the graphical user interface is executed.

It should be noted that the backpack interface at least includes an item storage area and an item assembly area, the item storage area is used for displaying a virtual item picked up but not assembled to the virtual object, and the item assembly area is used for displaying a virtual item picked up and assembled to the virtual object. Before the step of displaying an item assembly pop-up window in the graphical user interface, it is needed to determine whether the first target item is a virtual item that can be assembled in the item assembly area; in the condition that the first target item is a virtual item that can be assembled in the item assembly area, an item assembly interface is displayed in the item assembly pop-up window; and the item assembly interface at least partially includes an assembly position for assembling the virtual item within the item assembly area. That is, when the first target item is a virtual item for item assembly, the item assembly pop-up window is displayed in the graphical user interface.

In an embodiment, if the first target item is a virtual item that can be assembled in the item assembly area, the step of displaying the item assembly pop-up window in the graphical user interface is executed, which specifically includes: when the first target item is a virtual item that can be assembled in the item assembly area, it is determined whether a second target item has been assembled in the assembly position corresponding to the first target item in the item assembly area; if yes, the item assembly pop-up window is displayed in the graphical user interface; and if not, the first target item is directly controlled to be assembled to the assembly position. That is, when the first target item is a virtual item for item assembly, and there is already an assembled second target item in the assembly position corresponding to the first target item, the item assembly pop-up window is displayed in the graphical user interface.

In some embodiments, when the first target item is a virtual item that can be assembled in the item assembly area, it is determined whether the assembly position corresponding to the first target item in the item assembly area has been assembled with a second target item; if yes, the item assembly pop-up window is displayed in the graphical user interface, and the player may decide whether to replace the second target item with the first target item according to information such as an assembly parameter and a game scene requirement. If the assembly position corresponding to the first target item is not assembled with a second target item, that is, when the assembly position corresponding to the first target item is not full, the first target item is directly assembled to the assembly position, without displaying the item assembly pop-up window.

Figure 3:
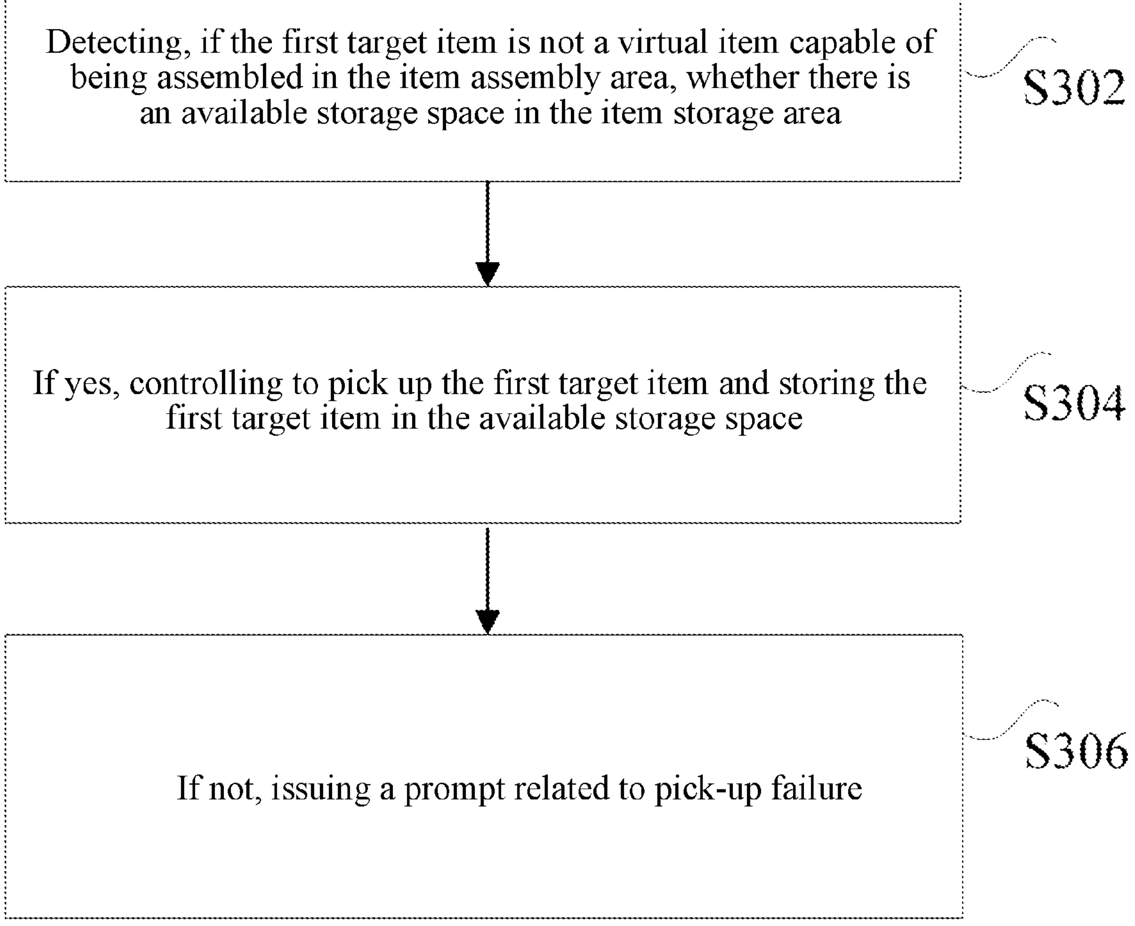
FIG. 3 is a schematic step flowchart of a method for picking up an item in a game according to an embodiment of the present disclosure.

As an embodiment, FIG. 3 is a schematic step flowchart of a method for picking up an item in a game according to an embodiment of the present disclosure. As shown in FIG. 3, the method further includes the following.

In step S302, if the first target item is not a virtual item that can be assembled in the item assembly area, it is detected whether there is an available storage space in the item storage area;

In step S304, if yes, the first target item is controlled to be picked up, and the first target item is stored in the available storage space;

In step S306, if not, a prompt related to pick-up failure is issued.

In some embodiments, in some military competition experience games or shooting game scenes, in addition to virtual items capable of being assembled such as weapons, weapon accessories, armor and the like, there are conventional virtual items such as drugs, bandages and the like. Among them, the virtual items capable of being assembled such as weapons, weapon accessories, armor and the like are placed into the item assembly region, and the conventional virtual items such as drugs, bandages and the like are placed into the item storage region. When the first target item is not a virtual item that can be assembled in the item assembly region, that is, the first target item is a conventional virtual item such as a drug, a bandage and the like, it is detected whether there is an available storage space in the item storage region; if the item storage region is not in a full state, the first target item can be directly picked up into the item storage region; otherwise, a prompt related to pick-up failure is issued.

In an embodiment, the method further includes: highlighting an assembly position that can be used for assembling a virtual item in the item assembly interface, so that the assembly position is visually distinguishable; and/or, highlighting an assembly position corresponding to the first target item in the item assembly interface, so that the assembly position is visually distinguishable.

Figure 4:
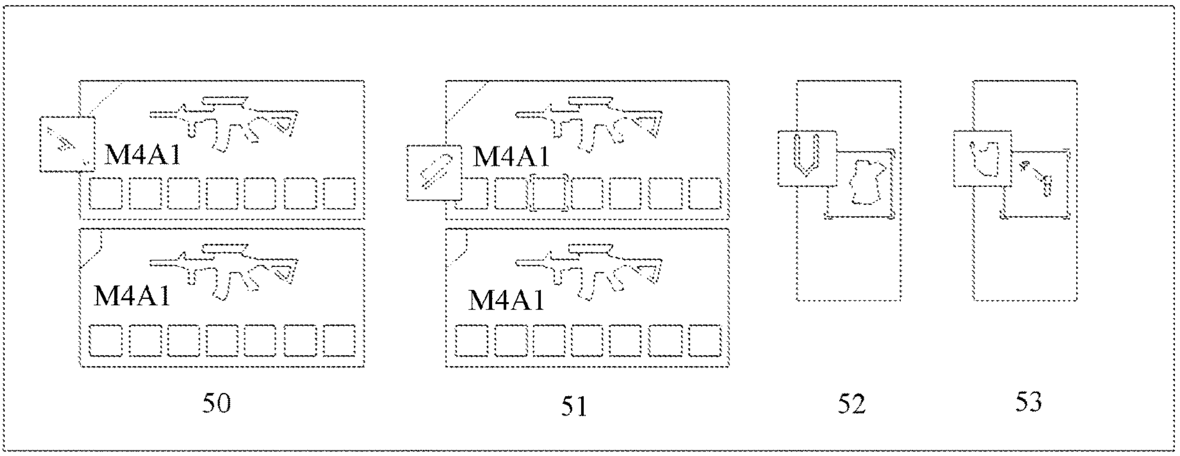
FIG. 4 is a schematic diagram of an item assembly interface according to another embodiment of the present disclosure.

As an embodiment, FIG. 4 is a schematic diagram of an item assembly interface according to another embodiment of the present disclosure. As shown in FIG. 4, when the player drags the first target item to a space (also referred to as a lattice) that can be picked up where the second target item is located, the icon or the bottom board of the lattice may be highlighted, or may be prompted with a four-corner frame shown in FIG. 4, which focuses on prompting the player that the replaceable second target item is in this lattice region. For example, the appearance of the four-corner frame represents that the replaceable second target item is the area where the four-corner frame is located. For another example, when the player drags the first target item to the lattice where the second target item is located, the bottom board of the lattice is highlighted, which focuses on prompting the player that it is in the area of the highlighted lattice at this time.

In some embodiments, in the embodiments of the present disclosure, when the player drags the first target item to the lattice where the second target item is located, the second icon of the second target item is highlighted. For example, FIG. 4 schematically shows four different operation interface display effects before and after the operation of picking up a game equipment or replacing a picked-up game equipment. For example, for the interface display effect 50 before performing the operation of picking up a game equipment or replacing a picked-up game equipment, before performing the operation of picking up a game equipment or replacing a picked-up game equipment, the bottom board of the lattice is not highlighted, and a four-corner frame does not appear. For interface display effect 51 of the replacement operation to replace an accessory with a firearm, when the player picks up an accessory as the first target item and selects a firearm as the second target item, the lattice where the firearm is located is highlighted, and a four-corner frame may appear on the lattice. For the interface display effect 52 of the guard replacement operation, when the player picks up a third-level armor as the first target item and selects a second-level armor as the second target item, the lattice where the second-level armor is located is highlighted, and a four-corner frame may appear on the lattice. For the interface display effect 53 of the auxiliary weapon/missile replacement operation, when the player picks up an auxiliary weapon as the first target item and selects a missile as the second target object, the lattice where the missile is located is highlighted, and a four-corner frame may appear on the lattice.

In an embodiment, before the step of controlling the first target item to be assembled to the assembly position corresponding to the first target item in the item assembly interface, the method further includes the following.

In step S402, it is determined whether the assembly position corresponding to the first target item in the item assembly area has been assembled with a second target item;

In step S404, if yes, the first target item is controlled to be assembled to the assembly position, and the second target item is directly discarded, or the second target item is stored in an available storage space of the item storage area.

According to embodiments of the present disclosure, there is provided a method for processing a second target item, where, after the first target item is controlled to replace the second target item, the second target item may be directly discarded, or the second target item may be stored in an available storage space of the item storage area.

In some embodiments, when the assembly position corresponding to the first target item in the item assembly area has been assembled with a second target item, at least one item to be replaced of other kinds in addition to the first target item is included in the assembly position corresponding to the first target item, and any of the item to be replaced may be selected as the second target item.

In some embodiments, the player may set the preferential selection manner for the second target item by himself. The item that can be preferentially selected as the second target item may be, but is not limited to, an item of the same kind as the first target item, an item of a different kind from the first target item, an item with a low use frequency, and an item not in the item pick-up list.

In an embodiment, when there is no available storage space in the item storage area, the second target item is controlled to be discarded.

In some embodiments, when there is no available storage space in the item storage area, that is, when the item storage area is filled with virtual items, the player may determine, according to the game requirement, whether to replace the second target item with the first target item, that is, whether to pick up the first target item into the backpack. If the player decides to pick up the first target item into the backpack, the second target item is controlled to be discarded. Among them, the basis, that the player determines whether to replace the second target item with the first target item, may be but is not limited to the game requirement, a performance parameter comparison condition between the first target item and the second target item, etc.

In an embodiment, after the step of displaying an item assembly interface in the item assembly pop-up window, the method further includes: in response to a pick-up instruction for the first target item, controlling to pick up the first target item.

In some embodiments, when there is an available space in the item assembly area, the player may select not to replace the item, and directly control to pick up the first target item into the available space in the item assembly area for standby.

In an embodiment, the type of the virtual item includes one or more of the following: a weapon, a weapon accessory, an armor, and a prop. The item assembly interface includes at least a weapon assembly interface, an armor assembly interface, and a prop assembly interface.

Figure 5:
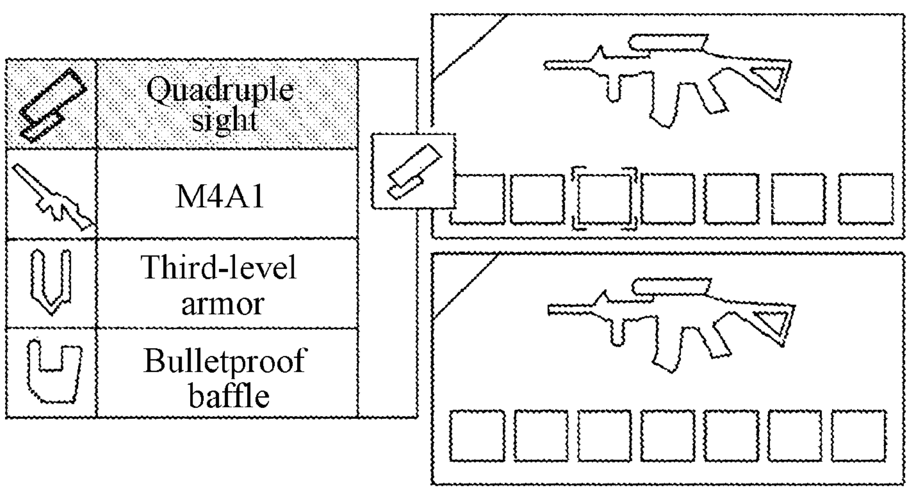
FIG. 5 is a schematic diagram of an item assembly interface according to still another embodiment of the present disclosure.
Figure 5:
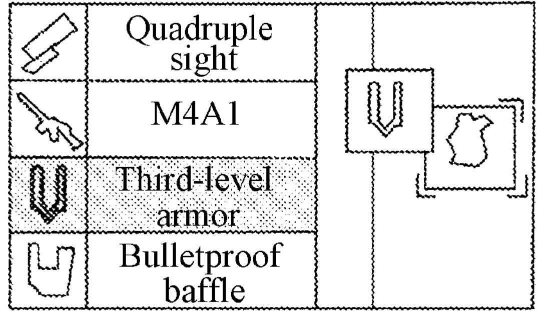
Figure 5:
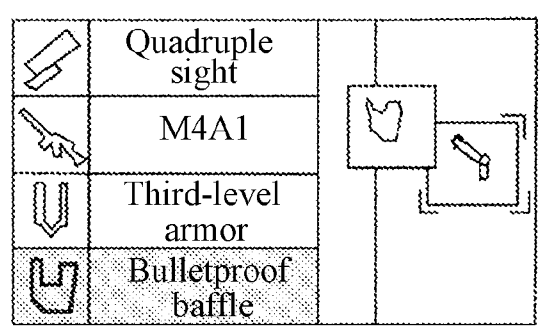

In some embodiments, the prop may include, but is not limited to, a smoke bomb, a landmine, a grenade, or the like. The item assembly interface may be divided into more than one small interface, such as a weapon assembly interface, an armor assembly interface, and a prop assembly interface, according to the type of the virtual item. For example, FIG. 5 is a schematic diagram of an item assembly interface according to still another embodiment of the present disclosure. For the firearm/accessory situation 40 shown in FIG. 5, when the first target item (a quadruple sight) is dragged to the position of the second target item (a firearm M4A1), since there is more than one different type of firearm M4A1 in the item assembly area, a small interface of the firearm M4A1 may be further popped up in the item assembly interface for the player to make a further selection.

In an embodiment, the step of displaying an item assembly pop-up window in the graphical user interface specifically includes: determining a target item assembly interface associated with the first target item according to the attribute parameter of the first target item, and displaying the target item assembly interface in the item assembly pop-up window; where the attribute parameter includes an item type and/or an assembly relationship.

In the embodiment, the target item assembly interface associated with the first target item is determined according to the attribute parameter of the first target item, and the target item assembly interface is displayed in the item assembly pop-up window; where the attribute parameter includes the item type and/or the assembly relationship, so that the purpose of quickly and accurately identifying the target item assembly interface associated with the first target item is achieved, thus the technical effect of improving the virtual item assembly/replacement efficiency is achieved.

In an embodiment, the step of displaying an item assembly pop-up window in the graphical user interface specifically includes: when the first target item is a weapon accessory, determining a virtual weapon capable of being assembled with the weapon accessory according to the assembly relationship of the weapon accessory, and displaying a weapon assembly interface corresponding to the virtual weapon in the item assembly pop-up window; where the weapon assembly interface includes a weapon assembly position and a weapon accessory assembly position.

In the embodiment, when the first target item is a weapon accessory, a weapon assembly interface corresponding to the virtual weapon is displayed in the item assembly pop-up window. The player can quickly obtain related parameter information of the virtual weapon and the weapon accessory, and determine whether to pick up the weapon accessory into the backpack.

As an embodiment, for the firearm/accessory situation 40 shown in FIG. 5, when the first target item is a weapon accessory of a quadruple sight, the virtual weapon M4A1 that can be assembled with the weapon accessory is determined according to the assembly relationship of the weapon accessory, a weapon assembly interface corresponding to the virtual weapon M4A1 is displayed in the item assembly pop-up window, and the assembly position of the virtual weapon M4A1 and the assembly position of the weapon accessory of the quadruple sight are highlighted on the weapon assembly interface.

Figure 6:
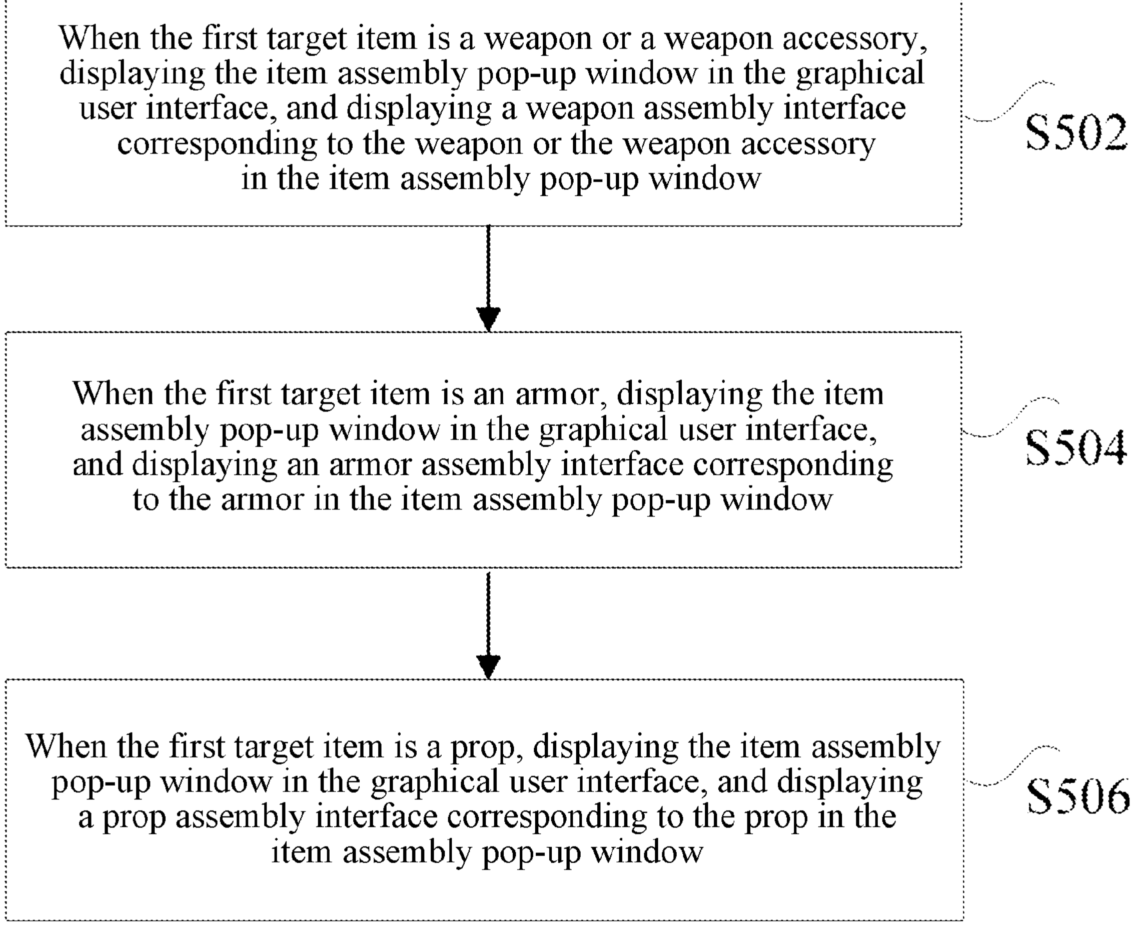
FIG. 6 is a schematic step flowchart of a method for picking up an item in a game according to another embodiment of the present disclosure.

As an embodiment, FIG. 6 is a schematic step flowchart of a method for picking up an item in a game according to another embodiment of the present disclosure. As shown in FIG. 6, the step of displaying an item assembling pop-up window in the graphical user interface specifically includes the following.

In step S502, when the first target item is a weapon or a weapon accessory, the item assembly pop-up window is displayed in the graphical user interface, and g a weapon assembly interface corresponding to the weapon or weapon accessory is displayed in the item assembly pop-up window;

In step S504, when the first target item is an armor, the item assembly pop-up window is displayed in the graphical user interface, and an armor assembly interface corresponding to the armor is displayed in the item assembly pop-up window.

In step S506, when the first target item is a prop, the item assembly pop-up window is displayed in the graphical user interface, and a prop assembly interface corresponding to the prop is displayed in the item assembly pop-up window.

In the embodiment, the corresponding relationship between the virtual item type and the pop-up window interface is further defined. That is, when the first target item is a weapon or a weapon accessory; the item assembly pop-up window is displayed in the graphical user interface, and a weapon assembly interface corresponding to the weapon or the weapon accessory is displayed in the item assembly pop-up window; where the weapon and the weapon accessory are used as one type, and the relationship between the weapon and the weapon accessory is not distinguished any more. When the first target item is an armor, the item assembly pop-up window is displayed in the graphical user interface, and an armor assembly interface corresponding to the armor is displayed in the item assembly pop-up window. When the first target item is a prop, the item assembly pop-up window is displayed in the graphical user interface, and a prop assembly interface corresponding to the prop is displayed in the item assembly pop-up window.

In an embodiment, the first touch operation includes a click operation acting on the first target item, and/or, a drag operation for dragging the first target item out of the item pick-up list.

In some embodiments, when the player wants to perform a virtual item assembly/replacement operation, a click operation on the first target item is controlled; when the first target item is dragged to the pickable space position where the second target item is located, in response to a second sliding touch operation for dragging the first target item to the second target item, the second target item is selected from at least one item to be replaced, and the second target item is synchronously displayed in the game interface.

In an embodiment, when the first touch operation is a drag operation for dragging the first target item out of the item pick-up list, the method further includes: generating an assembly instruction for the first target item in response to an end of the drag operation.

In some embodiments, when the first target item is a virtual item that can be assembled in the item assembly area, after the drag operation ends, an assembly instruction for the first target item is generated. In other words, it is determined whether the assembly position corresponding to the first target item in the item assembly area has been assembled with a second target item; if yes, an item assembly pop-up window is displayed in the graphical user interface, and the player may decide whether to replace the second target item according to information such as the assembly parameter, the game requirement, and the like; if the assembly position corresponding to the first target item has not been assembled with a second target item, that is, when the assembly position corresponding to the first target item is not full, the first target item is automatically assembled to the assembly position.

In some embodiments, when the player wants to perform a virtual item assembly/replacement operation, a touch operation on the trigger control of the item pick-up list is controlled; when the first target item is dragged to a pickable space position where the second target item is located, in response to a second sliding touch operation for dragging the first target item to the second target item, the second target item is selected from the at least one item to be replaced, and the second target item is synchronously displayed in the game interface.

In an embodiment, when the first touch operation is a drag operation for dragging the first target item from the item pick-up list to the trigger control, the method further includes: generating an assembly instruction for the first target item in response to an end of the drag operation.

Figure 7:
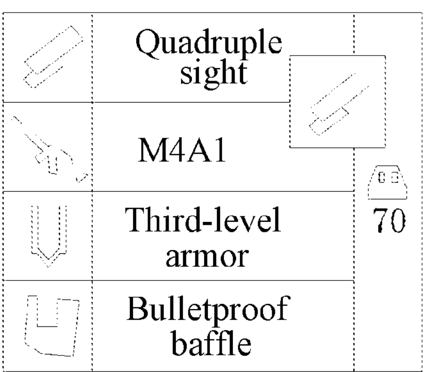
FIG. 7 is a schematic diagram of an item pick-up list according to another embodiment of the present disclosure.

As an embodiment, FIG. 7 is a schematic diagram of an item pick-up list according to an embodiment of the present disclosure. As shown in FIG. 7, the item pick-up list is displayed with a quadruple sight, an M4A1 firearm/accessory, a third-level armor, a bulletproof baffle, etc. As shown in FIG. 7, the item pick-up list includes a trigger control 70. The first touch operation includes: a touch operation acting on the trigger control 70, and/or, a drag operation for dragging the first target item from the item pick-up list to the trigger control 70.

In some embodiments, when the first target item is a virtual item that can be assembled in the item assembly area, after the drag operation ends, an assembly instruction for the first target item is generated. In other words, it is determined whether the assembly position corresponding to the first target item in the item assembly area has been assembled with a second target item; if yes, an item assembly pop-up window is displayed in the graphical user interface, and the player may decide whether to replace the second target item with the first target item according to information such as the assembly parameter, the game requirement, and the like; if the assembly position corresponding to the first target item has not been assembled with a second target item, that is, when the assembly position corresponding to the first target item is not full, the first target item is automatically assembled to the assembly position.

As an embodiment, FIG. 5 schematically shows a schematic diagram of an item pick-up list and an item assembly interface provided in a graphical user interface under three different situations, which are respectively the firearm/accessory replacement situation 40, the guard replacement situation 41, and the auxiliary weapon/missile replacement situation 42. In some embodiments, the item pick-up list may include a quadruple sight, an M4A1, a third-level armor, a bulletproof baffle, etc. The player drags the first target item to a pickable space where the second target item is located; and after letting go, the player can quickly replace the first target item with the second target item. In an embodiment, the item that is preferentially selected as the second target item may be an item of the same kind as the first target item; for example, for the guard replacement situation 41 in the item pick-up list shown in FIG. 5, when the player picks up the third-level armor, the second-level armor is replaced as the second target item.

In an embodiment, the item that is preferentially selected as the second target item may be an item of different kind from the first target item; for example, for the operation situation 42 of replacing the missile with the auxiliary weapon in the item pick-up list shown in FIG. 5, when the player picks up the auxiliary weapon, the missile is replaced.

In an embodiment, the item that is preferentially selected as the second target item may be an item with a lower use frequency. When the player sets the preferential selection manner for the second target item as the item with a low use frequency, the item with a lower use frequency is preferentially used as the second target item to be replaced. For example, for the replacement operation condition 40 of replacing the accessory with the firearm in the item pick-up list shown in FIG. 5, when the player picks up an accessory with a higher use frequency, the firearm with a lower use frequency is replaced.

Figure 8:
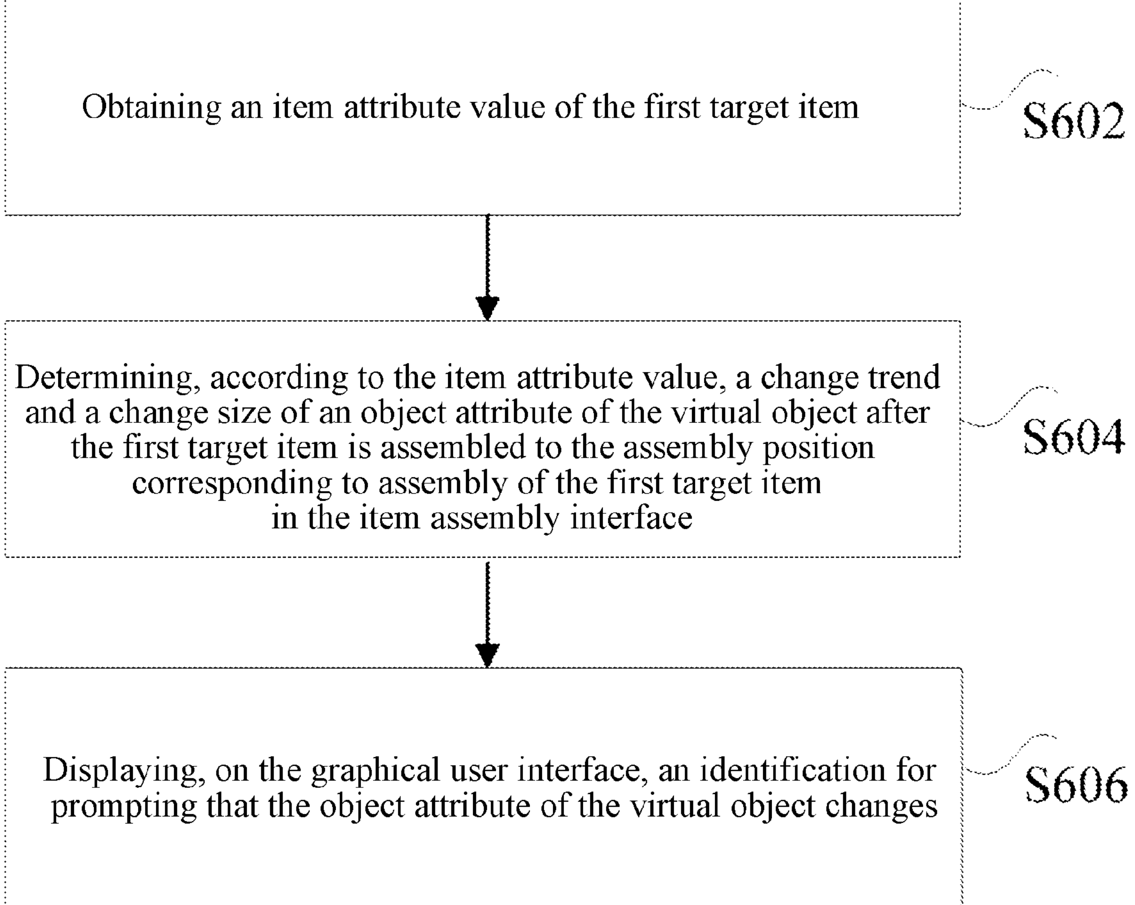
FIG. 8 is a schematic step flowchart of a method for picking up an item in a game according to another embodiment of the present disclosure.

As an embodiment, FIG. 8 is a schematic step flowchart of a method for picking up an item in a game according to another embodiment of the present disclosure. As shown in FIG. 8, before the step of responding to the assembly instruction for the first target item, the method further includes the following.

In step S602, an item attribute value of the first target item is obtained;

In step S604, according to the item attribute value, a change trend and a change size of an object attribute of the virtual object is determined after the first target item is assembled to the assembly position corresponding to assembly of the first target item in the item assembly interface;

In step S606, an identification, for prompting that the object attribute of the virtual object changes, is displaying on the graphical user interface.

Figure 9:
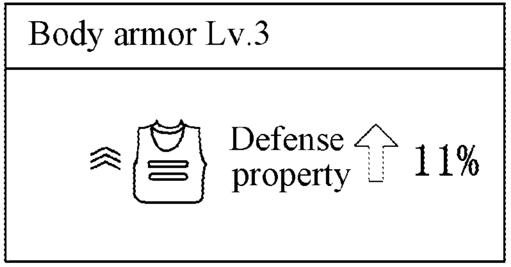
FIG. 9 is a schematic structural diagram of a graphical user display interface according to an embodiment of the present disclosure.

In an embodiment, FIG. 9 is a schematic structural diagram of a graphical user display interface according to an embodiment of the present disclosure. As shown in FIG. 9, the first target item is a body armor. After it is determined that the body armor is assembled to the assembly position corresponding to assembly of the body armor in the item assembly interface, it is displayed on the graphical user interface that the body armor can increase 11% of the defense attribute of the virtual object to remind the user of the effects of equipment replacement, thus providing a reference basis for the user whether to pick up the first target item.

Figure 10:
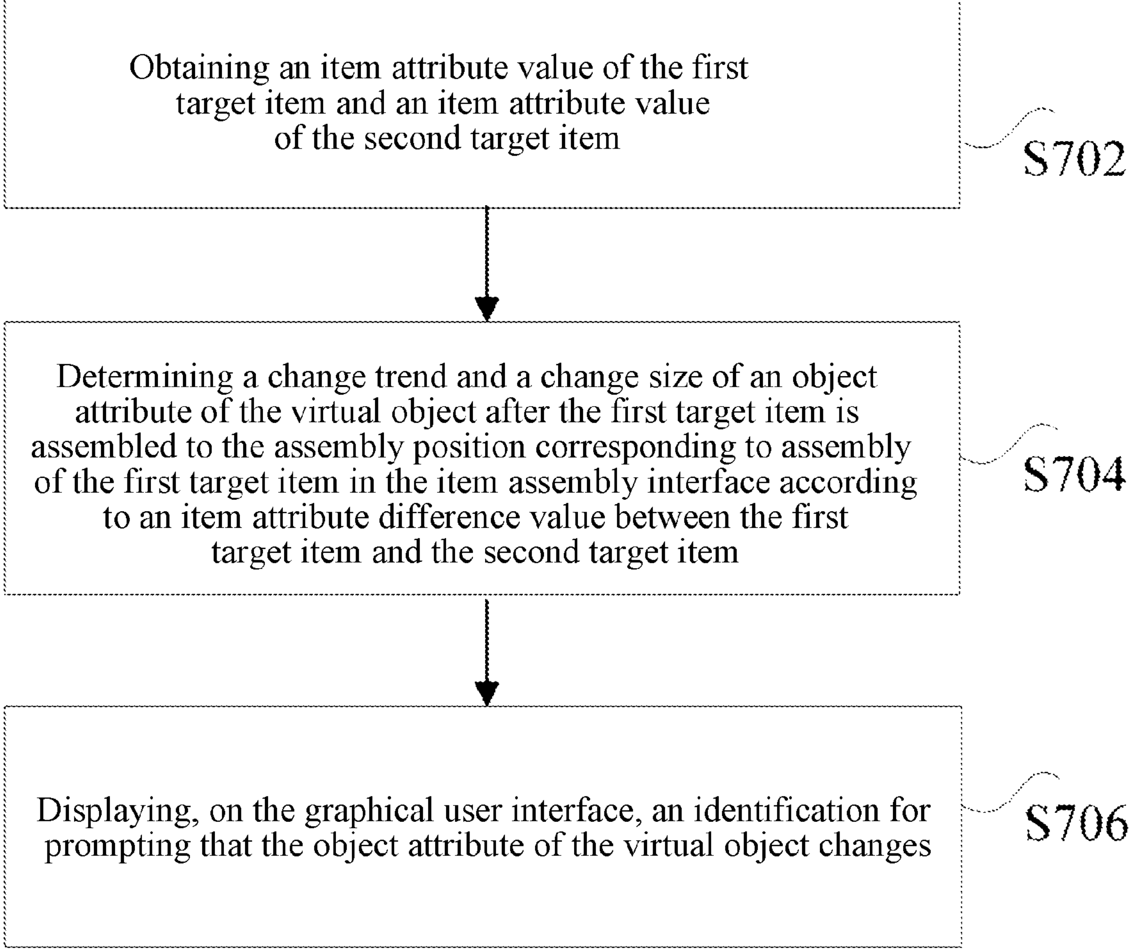
FIG. 10 is a schematic step flowchart of a method for picking up an item in a game according to another embodiment of the present disclosure.

As an embodiment, FIG. 10 is a schematic step flowchart of a method for picking up an item in a game according to another embodiment of the present disclosure. As shown in FIG. 10, when the assembly position corresponding to assembly of the first target item in the item assembly interface has been assembled with a second target item, before the step of responding to the assembly instruction for the first target item, the method further includes the following.

In step S702, an item attribute value of the first target item and an item attribute value of the second target item are obtained;

In step S704, according to an item attribute difference between the first target item and the second target item, a change trend and a change size of an object attribute of the virtual object is determined after the first target item is assembled to the assembly position corresponding to assembly of the first target item in the item assembly interface;

In step S706, an identification, for prompting that the object attribute of the virtual object changes, is displayed on the graphical user interface.

When the assembly position corresponding to assembly of the first target item in the item assembly interface has been assembled with a second target item, before the step of responding to the assembly instruction for the first target item, the item attribute values of the first target item and the second target item as well as the identification that the object attribute of the virtual object changes may be displayed on the graphical user interface, so as to remind the user of the effects of assembly replacement, thus providing a reference basis for the user to determine whether to perform assembly replacement.

According to the method for picking up an item in a game, the embodiments of the present disclosure may at least achieve the following technical effects: an item pick-up list is provided in the graphical user interface, where a trigger control may be provided in a replacement area of the item pick-up list; the trigger control may be used to quickly pick up a game equipment and replace the picked-up game equipment when being touched; by dragging the picked-up game equipment to the replacement area, the corresponding picked-up game equipment can be replaced for the item pick-up list, and the access space of the item pick-up list can also be adjusted. According to the embodiments of the present disclosure, the game interface volume is reduced, and the shielding rate of the game interface is greatly reduced, so that the view shielding of the player can be less.

Figure 11:
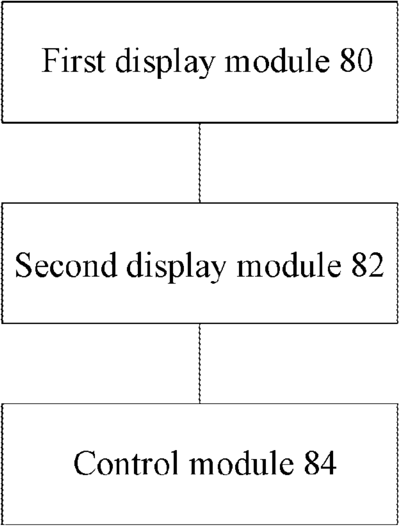
FIG. 11 is a schematic structural diagram of an apparatus for picking up an item in a game according to an embodiment of the present disclosure.

According to an embodiment of the present disclosure, there is further provided an apparatus embodiment for implementing the above-mentioned method for picking up an item in a game. FIG. 11 is a schematic structural diagram of an apparatus for picking up an item in a game according to an embodiment of the present disclosure. As shown in FIG. 11, the apparatus for picking up an item in a game includes a first display module 80, a second display module 82, and a control module 84.

The first display module is configured to provide an item pick-up list in the graphical user interface in response to an item pick-up trigger event in the game scene, where the item pick-up list includes a virtual item that can be picked up by the virtual object. The second display module is configured to determine a first target item, in response to a first touch operation acting on the item pick-up list, according to the first touch operation, and display an item assembly pop-up window in the graphical user interface, where an item assembly interface is displayed in the item assembly pop-up window, and the item assembly interface at least partially includes an assembly position for assembling the virtual item in the item assembly area. The control module is configured to respond to an assembly instruction for the first target item, and control to assemble the first target item to an assembly position corresponding to the first target item in the item assembly interface when the first target item is a virtual item that can be assembled in the item assembly area.

It should be noted that the above each module may be implemented by software or hardware. For example, for the latter, the above each module may be implemented in the following manner: the above each module may be located in the same processor; or, the above each module may be located in different processors in any combination.

It should be noted here that the first display module 80, the second display module 82, and the control module 84 correspond to steps S102 to S106 in the method embodiment, and examples and application scenarios implemented by the above modules and corresponding steps are the same, but are not limited to the content disclosed in the above method embodiments. It should be noted that the above modules may be run in a computer terminal as part of the apparatus.

It should be noted that the implementations of the present embodiments may refer to the related description in the method embodiments, and details are not described here again.

The above apparatus for picking up an item in a game may further include a processor and a memory. The first display module 80, the second display module 82, and the control module 84 are all stored in the memory as program units, and the processor executes the program units stored in the memory to implement corresponding functions.

The processor includes a kernel, and the kernel retrieves a corresponding program unit from the memory. The kernel may be set to be one or more. The memory may include a non-persistent memory, a random access memory (RAM), and/or a non-volatile memory in a computer-readable medium, such as a read-only memory (ROM) or a flash memory (flash RAM), and the memory includes at least one memory chip.

According to an embodiment of the present disclosure, there is further provided a non-volatile storage medium embodiment. In some embodiments, in the embodiment, the non-volatile storage medium includes a stored program, where, when the program runs, the device where the non-volatile storage medium is located is controlled to perform any one of the above methods for picking up an item in a game.

In some embodiments, in the embodiment, the non-volatile storage medium includes a stored program. In the embodiment, when the above program runs, the device where the non-volatile storage medium is located performs any one of the above methods for picking up an item in a game.

In some embodiments, when the program runs, the device where the non-volatile storage medium is located performs the following functions: providing a graphical user interface by a terminal device; the graphical user interface displaying at least a backpack control and a virtual object located in a game scene; the backpack control being configured to display a backpack interface on the graphical user interface in response to a touch operation; the backpack interface at least including an item storage area and an item assembly area; the item storage area being used for displaying a virtual item picked up but not assembled to the virtual object; the item assembly area being used for displaying a virtual item picked up and assembled to the virtual object; and the method including: providing an item pick-up list in the graphical user interface in response to an item pick-up trigger event in the game scene, where the item pick-up list includes a virtual item that can be picked up by the virtual object; determining a first target item, in response to a first touch operation acting on the item pick-up list, according to the first touch operation, and displaying an item assembly pop-up window in the graphical user interface, where an item assembly interface is displayed in the item assembly pop-up window, and the item assembly interface at least partially includes an assembly position for assembling the virtual item in the item assembly area; in response to an assembly instruction for the first target item, controlling to assemble the first target item to an assembly position corresponding to the first target item in the item assembly interface when the first target item is a virtual item that can be assembled in the item assembly area.

For the steps of the method for picking up an item in a game in the embodiment, reference may be made to the method embodiments, and details are not described here again.

Through the above embodiments, the purposes of quickly picking up a game equipment and replacing a picked-up game equipment are achieved, thus achieving the technical effects of the interface volume being reduced, the interruption feeling being weak and the strategic deployment response being fast, and further solving the technical problems in the related art that the game character is killed and the game interruption feeling is strong due to the fact that the player opens the backpack to pick up or replace the game prop.

According to an embodiment of the present disclosure, there is provided an electronic device, the device including a processor, a memory, and a program stored on the memory and executable on the processor. When the processor executes the program, the following steps are implemented: providing a graphical user interface by a terminal device; the graphical user interface displaying at least a backpack control and a virtual object located in a game scene; the backpack control being configured to display a backpack interface on the graphical user interface in response to a touch operation; the backpack interface at least including an item storage area and an item assembly area; the item storage area being used for displaying a virtual item picked up but not assembled to the virtual object; the item assembly area being used for displaying a virtual item picked up and assembled to the virtual object; and the method including: providing an item pick-up list in the graphical user interface in response to an item pick-up trigger event in the game scene, where the item pick-up list includes a virtual item that can be picked up by the virtual object; determining a first target item, in response to a first touch operation acting on the item pick-up list, according to the first touch operation, and displaying an item assembly pop-up window in the graphical user interface, where an item assembly interface is displayed in the item assembly pop-up window, and the item assembly interface at least partially includes an assembly position for assembling the virtual item in the item assembly area; in response to an assembly instruction for the first target item, controlling to assemble the first target item to an assembly position corresponding to the first target item in the item assembly interface when the first target item is a virtual item that can be assembled in the item assembly area.

According to an embodiment of the present disclosure, there is provided an embodiment of an electronic device, including a memory and a processor. A computer program is stored in the memory, and the processor is configured to run the computer program to execute the above method for picking up an item in a game.

For the steps of the method for picking up an item in a game in the embodiment, reference may be made to the method embodiments, and details are not described here again.

Through the above embodiment, the purposes of quickly picking up a game equipment and replacing a picked-up game equipment are achieved, thus achieving the technical effects of the interface volume being reduced, the interruption feeling being weak and the strategic deployment response being fast, and further solving the technical problems in the related art that the game character is killed and the game interruption feeling is strong due to the fact that the player opens the backpack to pick up or replace the game prop.

The present disclosure further provides a computer program product. When executed on a data processing device, the computer program product is adapted to perform a program that initializes with the following method steps: providing a graphical user interface by a terminal device; the graphical user interface displaying at least a backpack control and a virtual object located in a game scene; the backpack control being configured to display a backpack interface on the graphical user interface in response to a touch operation; the backpack interface at least including an item storage area and an item assembly area; the item storage area being used for displaying a virtual item picked up but not assembled to the virtual object; the item assembly area being used for displaying a virtual item picked up and assembled to the virtual object; and the method including: providing an item pick-up list in the graphical user interface in response to an item pick-up trigger event in the game scene, where the item pick-up list includes a virtual item that can be picked up by the virtual object; determining a first target item, in response to a first touch operation acting on the item pick-up list, according to the first touch operation, and displaying an item assembly pop-up window in the graphical user interface, where an item assembly interface is displayed in the item assembly pop-up window, and the item assembly interface at least partially includes an assembly position for assembling the virtual item in the item assembly area; in response to an assembly instruction for the first target item, controlling to assemble the first target item to an assembly position corresponding to the first target item in the item assembly interface when the first target item is a virtual item that can be assembled in the item assembly area.

For the steps of the method for picking up an item in a game in the embodiment, reference may be made to the method embodiments, and details are not described here again.

Through the above embodiment, the purposes of quickly picking up a game equipment and replacing a picked-up game equipment are achieved, thus achieving the technical effects of the interface volume being reduced, the interruption feeling being weak and the strategic deployment response being fast, and further solving the technical problems in the related art that the game character is killed and the game interruption feeling is strong due to the fact that the player opens the backpack to pick up or replace the game prop.

The sequence numbers of the embodiments of the present disclosure are merely for description, and do not represent the advantages and disadvantages of the embodiments.

In the above embodiments of the present disclosure, the description of each embodiment has its own emphasis. The part that is not described in detail in some embodiments may refer to the related description of other embodiments.

In several embodiments provided in the present disclosure, it should be understood that the disclosed technical content may be implemented in other manners. Among them, the apparatus embodiments described above are merely illustrative; for example, the division of the units may be a logical function division, and there may be another division manner during actual implementation; for example, a plurality of units or components may be combined or may be integrated into another system, or some features may be omitted or not performed. In addition, the mutual coupling or direct coupling or communication connection shown or discussed may be an indirect coupling or communication connection through some interfaces, units, or modules, and may be in an electrical or other form.

The units described as separate components may or may not be physically separate, and components displayed as units may or may not be physical units; that is, they may be located in one place, or may be distributed on a plurality of units. Some or all of the units may be selected according to actual needs to achieve the objectives of the solutions of the embodiments.

In addition, the various functional units in the embodiments of the present disclosure may be integrated into one processing unit, or each of the units may exist alone physically, or two or more units may be integrated into one unit. The integrated unit may be implemented in the form of hardware, or may be implemented in the form of a software functional unit.

When the integrated unit is implemented in the form of a software functional unit and sold or used as an independent product, the integrated unit may be stored in a computer-readable non-volatile storage medium. Based on such understanding, the essence of the technical solution of the present disclosure or the part that contributes to the related art or the whole or part of the technical solution may be embodied in the form of a software product. The computer software product is stored in a non-volatile storage medium, and includes several instructions for enabling a computer device (which may be a personal computer, a server, or a network device, etc.) to perform all or part of the steps of the method according to various embodiments of the present disclosure. The above non-volatile storage medium includes various medium that can store program codes, such as a USB flash disk, a read-only memory (ROM), a random access memory (RAM), a mobile hard disk, a magnetic disk, or an optical disc.

The above description is only preferred embodiments of the present disclosure. It should be noted that, for those of ordinary skill in the art, several improvements and modifications may be made without departing from the principles of the present disclosure, and these improvements and modifications should also be regarded as the protection scope of the present disclosure.

What is claimed is:

1. A method for picking up an item in a game, comprising:

providing an item pick-up list in a graphical user interface provided by a terminal device in response to an item pick-up trigger event in a game scene, wherein the graphical user interface displays a backpack control and a virtual object located in the game scene, the backpack control is configured to display a backpack interface on the graphical user interface in response to a touch operation, the backpack interface comprises an item storage area and an item assembly area, the item storage area is used for displaying a virtual item picked up but not assembled to the virtual object, the item assembly area is used for displaying a virtual item picked up and assembled to the virtual object, and the item pick-up list comprises a virtual item capable of being picked up by the virtual object;

determining a first target item, in response to a first touch operation acting on the item pick-up list, according to the first touch operation, and displaying an item assembly pop-up window in the graphical user interface, wherein an item assembly interface is displayed in the item assembly pop-up window, and the item assembly interface comprises an assembly position for assembling a virtual item in the item assembly area; and controlling, in response to an assembly instruction for the first target item, to assemble the first target item to an assembly position corresponding to the first target item in the item assembly interface when the first target item is a virtual item capable of being assembled in the item assembly area.

2. The method according to claim 1, wherein displaying the item assembly pop-up window in the graphical user interface comprises:

in response to determining that the first target item is a virtual item capable of being assembled in the item assembly area, displaying the item assembly pop-up window in the graphical user interface.

3. The method according to claim 2, wherein, in response to determining that the first target item is a virtual item capable of being assembled in the item assembly area, displaying the item assembly pop-up window in the graphical user interface comprises:

in response to determining that the assembly position corresponding to the first target item in the item assembly area has been assembled with a second target item, displaying the item assembly pop-up window in the graphical user interface; and in response to determining that the assembly position corresponding to the first target item in the item assembly area has not been assembled with a second target item, directly controlling to assemble the first target item to the assembly position.

4. The method according to claim 2, wherein in response to determining that the first target item is not a virtual item capable of being assembled in the item assembly area, the method further comprises:

in response to detecting an available storage space in the item storage area, controlling to pick up the first target item and storing the first target item in the available storage space; and in response to detecting no available storage space in the item storage area, issuing a prompt related to pick-up failure.

5. The method according to claim 1, further comprising at least one of:

highlighting the assembly position for assembling the virtual item in the item assembly interface, so that the assembly position is visually distinguishable; or highlighting the assembly position corresponding to the first target item in the item assembly interface, so that the assembly position is visually distinguishable.

6. The method according to claim 1, further comprising:

in response to determining that the assembly position corresponding to the first target item in the item assembly area has been assembled with a second target item, controlling to assemble the first target item to the assembly position, and directly discarding the second target item, or storing the second target item in an available storage space of the item storage area.

7. The method according to claim 6, further comprising:

controlling to be discard the second target item in response to determining that there is no available storage space in the item storage area.

8. The method according to claim 1, further comprising:

controlling to pick up the first target item in response to a pick-up instruction for the first target item.

9. The method according to claim 1, wherein a type of the virtual item comprises at least one of following: a weapon, a weapon accessory, an armor, or a prop; and the item assembly interface comprises a weapon assembly interface, an armor assembly interface, and a prop assembly interface.

10. The method according to claim 1, wherein displaying the item assembly pop-up window in the graphical user interface comprises:

determining a target item assembly interface associated with the first target item according to an attribute parameter of the first target item, and displaying the target item assembly interface in the item assembly pop-up window, wherein the attribute parameter comprises at least one of an item type or an assembly relationship.

11. The method according to claim 10, wherein displaying the item assembly pop-up window in the graphical user interface comprises:

in response to determining that the first target item is a weapon accessory, determining a virtual weapon capable of being assembled with the weapon accessory according to an assembly relationship of the weapon accessory, and displaying a weapon assembly interface corresponding to the virtual weapon in the item assembly pop-up window, wherein the weapon assembly interface comprises a weapon assembly position and a weapon accessory assembly position.

12. The method according to claim 10, wherein displaying the item assembly pop-up window in the graphical user interface comprises:

in response to determining that the first target item is a weapon or a weapon accessory, displaying the item assembly pop-up window in the graphical user interface, and displaying a weapon assembly interface corresponding to the weapon or the weapon accessory in the item assembly pop-up window;

in response to determining that the first target item is an armor, displaying the item assembly pop-up window in the graphical user interface, and displaying an armor assembly interface corresponding to the armor in the item assembly pop-up window; and in response to determining that the first target item is a prop, displaying the item assembly pop-up window in the graphical user interface, and displaying a prop assembly interface corresponding to the prop in the item assembly pop-up window.

13. The method according to claim 1, wherein the first touch operation comprises at least one of: a click operation acting on the first target item; or, a drag operation for dragging the first target item out of the item pick-up list.

14. The method according to claim 13, wherein the first touch operation is the drag operation for dragging the first target item out of the item pick-up list, and the method further comprises:

generating an assembly instruction for the first target item in response to an end of the drag operation.

15. The method according to claim 1, wherein the item pick-up list comprises a trigger control, and the first touch operation comprises at least one of:

a touch operation acting on the trigger control; or a drag operation for dragging the first target item from the item pick-up list to the trigger control.

16. The method according to claim 15, wherein the first touch operation is the drag operation for dragging the first target item from the item pick-up list to the trigger control, and the method further comprises:

generating an assembly instruction for the first target item in response to an end of the drag operation.

17. The method according to claim 1, further comprising:

obtaining an item attribute value of the first target item;

determining, according to the item attribute value, a change trend and a change size of an object attribute of the virtual object after the first target item is assembled to the assembly position corresponding to assembly of the first target item in the item assembly interface; and displaying, on the graphical user interface, an identification for prompting that the object attribute of the virtual object changes.

18. The method according to claim 1, wherein the assembly position corresponding to assembly of the first target item in the item assembly interface has been assembled with the second target item, and the method further comprises:

obtaining an item attribute value of the first target item and an item attribute value of the second target item;

determining a change trend and a change size of an object attribute of the virtual object after the first target item is assembled to the assembly position corresponding to assembly of the first target item in the item assembly interface according to an item attribute difference value between the first target item and the second target item; and displaying, on the graphical user interface, an identification for prompting that the object attribute of the virtual object changes.

19. A non transitory storage medium, comprising a stored program, wherein when the program runs, a device where the non-transitory storage medium is located is controlled to perform a method for picking up an item in a game, the method comprising:

providing an item pick-up list in a graphical user interface provided by a terminal device in response to an item pick-up trigger event in a game scene, wherein the graphical user interface displays a backpack control and a virtual object located in the game scene, the backpack control is configured to display a backpack interface on the graphical user interface in response to a touch operation, the backpack interface comprises an item storage area and an item assembly area, the item storage area is used for displaying a virtual item picked up but not assembled to the virtual object, the item assembly area is used for displaying a virtual item picked up and assembled to the virtual object, and the item pick-up list comprises a virtual item capable of being picked up by the virtual object;

determining a first target item, in response to a first touch operation acting on the item pick-up list, according to the first touch operation, and displaying an item assembly pop-up window in the graphical user interface, wherein an item assembly interface is displayed in the item assembly pop-up window, and the item assembly interface comprises an assembly position for assembling a virtual item in the item assembly area; and controlling, in response to an assembly instruction for the first target item, to assemble the first target item to an assembly position corresponding to the first target item in the item assembly interface when the first target item is a virtual item capable of being assembled in the item assembly area.

20. An electronic device, comprising a memory and a processor, wherein a computer program is stored in the memory, and the processor is configured to run the computer program to perform a method for picking up an item in a game, the method comprising:

providing an item pick-up list in a graphical user interface provided by a terminal device in response to an item pick-up trigger event in a game scene, wherein the graphical user interface displays a backpack control and a virtual object located in the game scene, the backpack control is configured to display a backpack interface on the graphical user interface in response to a touch operation, the backpack interface comprises an item storage area and an item assembly area, the item storage area is used for displaying a virtual item picked up but not assembled to the virtual object, the item assembly area is used for displaying a virtual item picked up and assembled to the virtual object, and the item pick-up list comprises a virtual item capable of being picked up by the virtual object;

determining a first target item, in response to a first touch operation acting on the item pick-up list, according to the first touch operation, and displaying an item assembly pop-up window in the graphical user interface, wherein an item assembly interface is displayed in the item assembly pop-up window, and the item assembly interface comprises an assembly position for assembling a virtual item in the item assembly area; and controlling, in response to an assembly instruction for the first target item, to assemble the first target item to an assembly position corresponding to the first target item in the item assembly interface when the first target item is a virtual item capable of being assembled in the item assembly area.

* * * * *